C. O. HOWARD.
LOCKING MEANS FOR AUTOMOBILE WHEELS.
APPLICATION FILED OCT. 3, 1919.
1,376,336.
Patented Apr. 26, 1921.
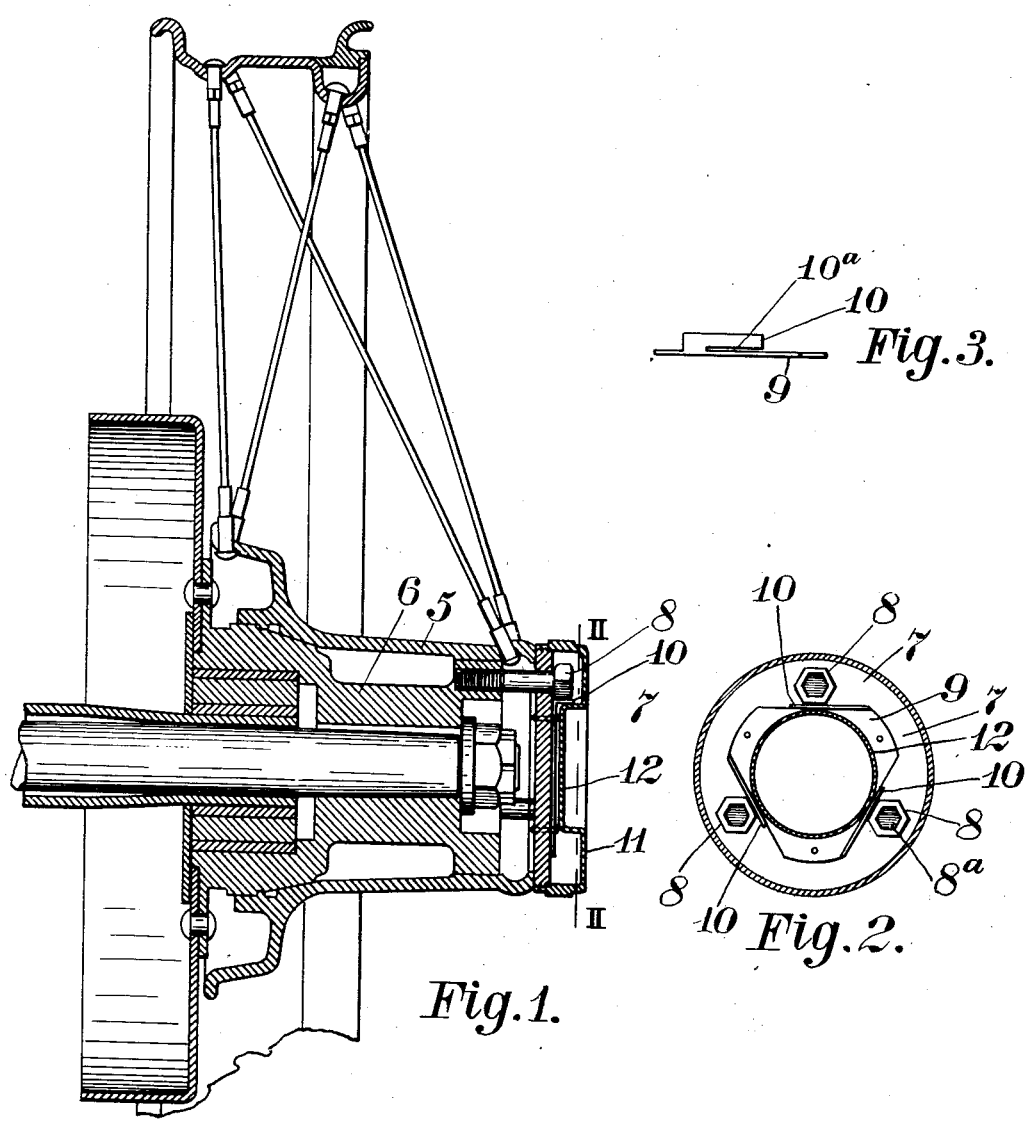

UNITED STATES PATENT OFFICE.

CHARLES O. HOWARD, OF COLUMBUS, OHIO, ASSIGNOR TO THE PHELPS MANUFACTURING COMPANY, OF COLUMBUS, OHIO, A CORPORATION OF OHIO.

LOCKING MEANS FOR AUTOMOBILE-WHEELS.

1,376,336.      Specification of Letters Patent.     Patented Apr. 26, 1921.

Application filed October 3, 1919. Serial No. 328,242.

*To all whom it may concern:*

Be it known that I, CHARLES O. HOWARD, a citizen of the United States, residing at Columbus, in the county of Franklin and State of Ohio, have invented a certain new and useful Improvement in Locking Means for Automobile-Wheels, of which the following is a specification.

A grave objection to demountable and interchangeable automobile wire wheels as at present upon the market is that they persist in automatically coming off. The prevailing remedy is to thread the hub caps with right and left hand threads and applying the caps with the right hand thread to the hub on the right hand side of the car and the caps with the left hand thread on the left hand side so that the motion of the wheels forward shall tend to turn the caps on rather than off. But this remedy results in much confusion and annoyance to motorists who, in many instances, are not keen or careful mechanics.

The object of the present invention is to provide a securing means that can be made identical in form for all four wheels thereby avoiding the necessity for special knowledge or care in the application.

The invention is embodied in the example herein shown and described, the features of novelty being finally claimed.

In the drawing—

Figure 1 is a view partly in section and partly in full of a fraction of a wire wheel mounted on the spindle or hub receiving member of an automobile rear axle.

Fig. 2 is a section on the line II—II Fig. 1.

Fig. 3 is an edge detail view of one of the devices for latching the bolt of the cap plate.

In the views 5 designates what is commonly termed the outer hub of the wheel, said hub together with the rim carrying the spokes or lacing. 6 designates the inner hub from which the outer hub and wheel are removable. The outer hub is secured to the inner hub by means of a circular plate 7 bearing against the outer end of the outer hub and perforated at three points equidistant from each other and from the center of the hub to receive headed bolts 8 engaging taps in the outer end of the inner hub. The rim of the plate 7 is threaded to receive the hub cap. On the outer face of the plate 7 is secured a plate 9 having three bent up portions slit at 10ª to form three spring tongues 10. These tongues are located to coincide with the sides of an equilateral triangle and near the bolts so as to yieldingly resist turning of the bolts. In effect the spring tongues are positioning devices, and also tend to latch the bolts from rotation when their faces lie parallel and close to the unflexed tongues. To lock the bolts from rotation I provide the hub cap 11 with an interior central boss 12 of a diameter to closely fit within the space formed by three tongues 10 and prevent movement thereof. As shown the tongues are normally tangent to the rim of the boss and the boss is turned with the turning of the cap into and out of position to lock the tongues. The interior of the rim of the cap is threaded to turn on the rim of plate 7 so that when the cap is turned up into its place the boss 12 is also turned into position to lock the tongues 10 from movement and consequently of the bolts 8. The heads of the bolts can have wrench sockets 8ª and the inner corners of the heads of the bolts are preferably rounded so that they can easily wedge down past the edges of the spring tongue when being turned into position.

It is obvious that the construction described can be made identical for all the wheels of a vehicle the construction being thereby standardized as to these details and incidentally effecting an economy in manufacture.

The forms of the parts can be changed without departing from the gist of the invention as claimed.

What I claim is:

1. In a demountable wheel, the combination with an inner hub part and an outer hub part, of a plurality of bolts equally spaced from the axis of the united hub parts and securing them together, a positioning device for each of said bolts consisting of a spring, and a hub cap having means thereon for locking the springs.

2. In a demountable wheel, the combination with an inner hub part and an outer hub part, of a plurality of bolts equally spaced from the axis of the united hub parts and securing them together, a positioning device for each of said bolts consisting of a spring, and a hub cap constructed to fit over said bolts only when the latter are properly positioned with reference to said springs.

3. In a demountable wheel, the combination with an inner hub part and an outer hub part, of a plurality of bolts securing the outer hub part to the inner hub part, said bolts equally spaced from the axis of the united hub parts, a positioning device for each of said bolts, and a hub cap having means thereon for locking the positioned bolts.

4. In a demountable wheel, the combination with an inner hub and an outer hub, of means for securing the outer hub to the inner hub including a member engaging the outer hub, a plurality of bolts equally spaced from the axis of the hub to secure said member to the inner hub, a positioning device for each of said bolts, and a hub cap having means thereon for locking the positioned bolts.

CHARLES O. HOWARD.